(12) United States Patent
Chen et al.

(10) Patent No.: US 11,405,597 B2
(45) Date of Patent: Aug. 2, 2022

(54) ILLUMINATION SYSTEM AND PROJECTION DEVICE

(71) Applicant: Coretronic Corporation, Hsin-Chu (TW)

(72) Inventors: Chun-Li Chen, Hsinchu (TW); Kun-Liang Jao, Hsinchu (TW); Chun-Hsin Lu, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 171 days.

(21) Appl. No.: 16/737,926

(22) Filed: Jan. 9, 2020

(65) Prior Publication Data

US 2020/0228765 A1 Jul. 16, 2020

(30) Foreign Application Priority Data

Jan. 15, 2019 (CN) .......................... 201920061482.X (51) Int. Cl.
*H04N 9/31* (2006.01)

(52) U.S. Cl.
CPC ........... *H04N 9/3155* (2013.01); *H04N 9/317* (2013.01)

(58) Field of Classification Search
None
See application file for complete search history.

(56) References Cited

U.S. PATENT DOCUMENTS

| 2013/0322056 A1 | 12/2013 | Konuma et al. |
| 2015/0160462 A1 | 6/2015 | Takahara |
| 2019/0101814 A1* | 4/2019 | Yamaguchi ............ G02B 5/20 |

FOREIGN PATENT DOCUMENTS

CN 102723421 10/2012

* cited by examiner

Primary Examiner — Samira Monshi
(74) Attorney, Agent, or Firm — JCIPRNET (57) ABSTRACT

An illumination system and a projection device are provided. The illumination system includes an excitation light source, a wavelength conversion module and a light combining prism. The excitation light source emits an exciting light beam. The light combining prism has a first, second, and third surfaces. The exciting light beam enters the light combining prism through the first surface, and is totally reflected by the second surface to leave the light combining prism through the third surface and is transmitted to the wavelength conversion module. The exciting light beam is converted into a wavelength converted light beam by a wavelength conversion region of the wavelength conversion module or reflected by a reflecting region of the wavelength conversion module at different timings, and the wavelength converted light beam or the exciting light beam sequentially penetrates through the third surface and the second surface to leave the light combining prism.

14 Claims, 7 Drawing Sheets

ILLUMINATION SYSTEM AND PROJECTION DEVICE

CROSS-REFERENCE TO RELATED APPLICATION

This application claims the priority benefit of China application serial no. 201920061482.X, filed on Jan. 15, 2019. The entirety of the above-mentioned patent application is hereby incorporated by reference herein and made a part of this specification.

BACKGROUND

Technical Field

The invention relates to an illumination system and a projection device, and particularly relates to an illumination system and a projection device having a light combining prism.

Description of Related Art

Recently, projection devices based on solid-state light sources such as light-emitting diode (LED) and laser diode (LD) have gradually gained a place in the market. Since the laser diode has a light-emitting efficiency higher than about 20%, in order to break through a light source limitation of the light-emitting diode, a pure color light source for a projector generated by exciting phosphor by a laser light source has been gradually developed.

Generally, a conventional laser projection device framework has optical elements such as a laser light source, a phosphor wheel, a filter wheel, an integration rod, a light valve, a projection lens, etc., where a laser light beam provided by the laser light source and passing through the optical elements passes through a phosphor wheel and a filter wheel to output a color light in timing, and after the color light is evenly shaped by the integration rod, a light valve is used to control an image grayscale, and then a projection lens is applied to project an image frame.

At present, an existing laser projection device technology is to concentrate a blue laser light onto a phosphor wheel to excite phosphor thereon to generate a converted color light, and under a light path framework of the existing laser projection device, the laser light must penetrate through the phosphor wheel and a field mirror or a reflection mirror is used to couple the laser light into the integration rod to provide a light path loop framework of a blue light, which results in a fact that a volume of a light combining system is not easy to be reduced and color uniformity of the projected image is poor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system having a small volume.

The invention is directed to a projection device having a small volume and good image quality.

Other objects and advantages of the invention may be further illustrated by the technical features broadly embodied and described as follows.

In order to achieve one or a portion of or all of the objects or other objects, an embodiment of the invention provides an illumination system. The illumination system is configured to provide an illumination light beam, and includes an excitation light source, a wavelength conversion module and a light combining prism. The excitation light source is configured to emit an exciting light beam. The wavelength conversion module is located on a transmission path of the exciting light beam, and has at least one wavelength conversion region and a reflecting region. The light combining prism is located on the transmission path of the exciting light beam, and has a first surface, a second surface and a third surface. The exciting light beam enters the light combining prism through the first surface, and is totally reflected by the second surface to leave the light combining prism through the third surface and is transmitted to the wavelength conversion module. The exciting light beam is converted into at least one wavelength converted light beam by the at least one wavelength conversion region of the wavelength conversion module or reflected by the reflecting region of the wavelength conversion module at different timings, and the at least one wavelength converted light beam coming from the wavelength conversion module or the exciting light beam sequentially penetrates through the third surface and the second surface of the light combining prism to leave the light combining prism.

In order to achieve one or a portion of or all of the objects or other objects, an embodiment of the invention provides a projection device. The projection device includes the aforementioned illumination system, a light valve and a projection lens. The light valve is located on the transmission path of the illumination light beam, and is configured to convert the illumination light beam into an image light beam. The projection lens is located on a transmission path of the image light beam, and is configured to convert the image light beam into a projection light beam.

According to the above description, the embodiments of the invention have at least one of following advantages or effects. In the embodiments of the invention, in the projection device and the illumination system, by configuring the light combining prism, the exciting light beam and the at least one wavelength converted light beam may be incident to a light homogenizing element in a similar light path and incident angle, which avails adjusting uniformity of the illumination light beam formed by the exciting light beam and the at least one wavelength converted light beam, so as to achieve good image quality of the projected image. Moreover, in the projection device and the illumination system, by configuring the light combining prism, it is unnecessary to configure an additional light path loop framework for the blue light, so as to achieve a system framework with a small volume. Moreover, since the exciting light beam and the at least one wavelength converted light beam converted from the exciting light beam are transmitted to the subsequent optical elements through the light combining prism, and propagating paths of the above light beams in the light combining prism are dispersed due to a light dispersion principle, energy density in the light combining prism is prevented from being excessively concentrated, so that a tolerance of the optical elements to the exciting light beam is improved, thereby increasing reliability of the illumination system and the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
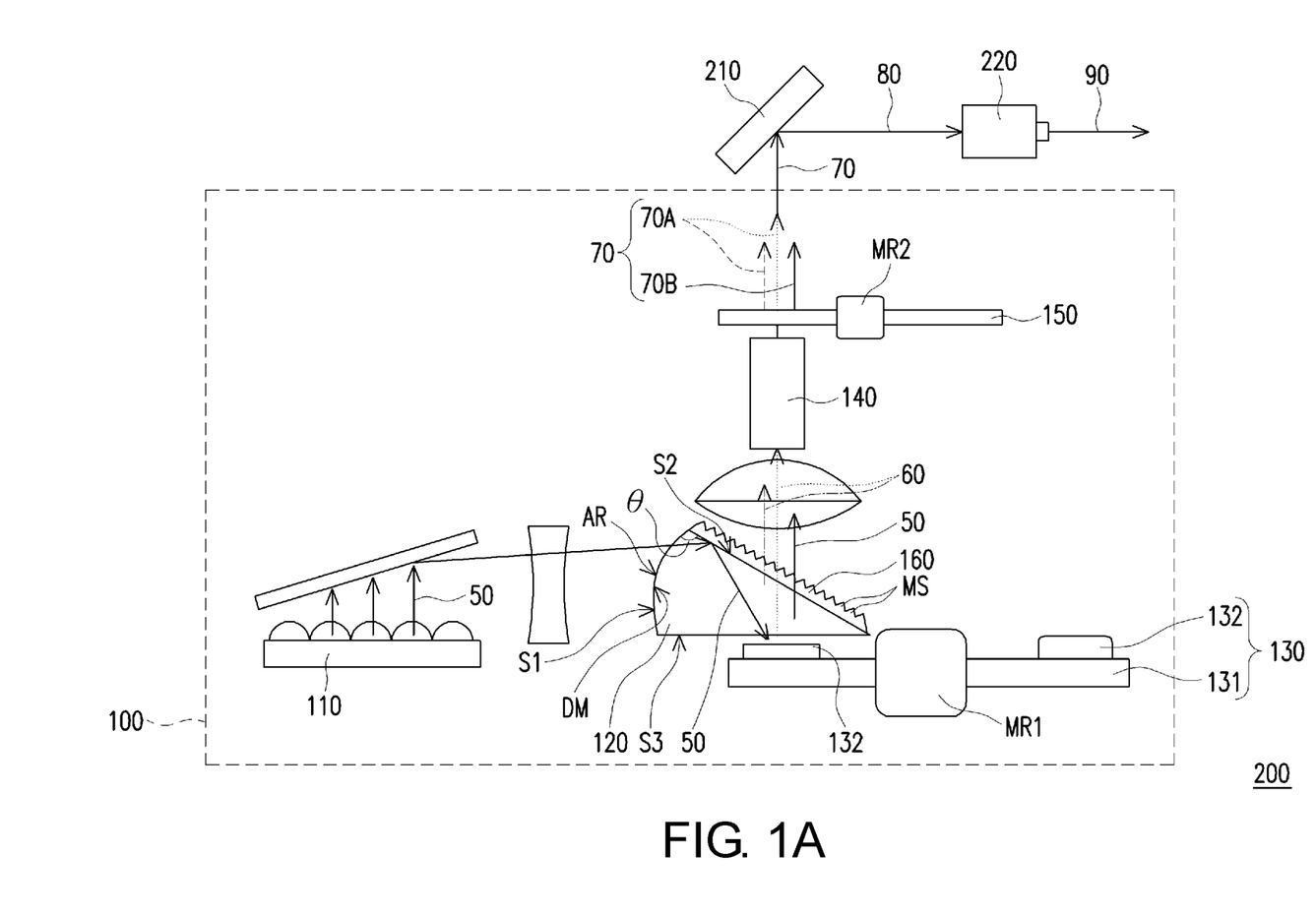
FIG. 1A is a structural schematic diagram of a projection device according to an embodiment of the invention.
Figure 2A:
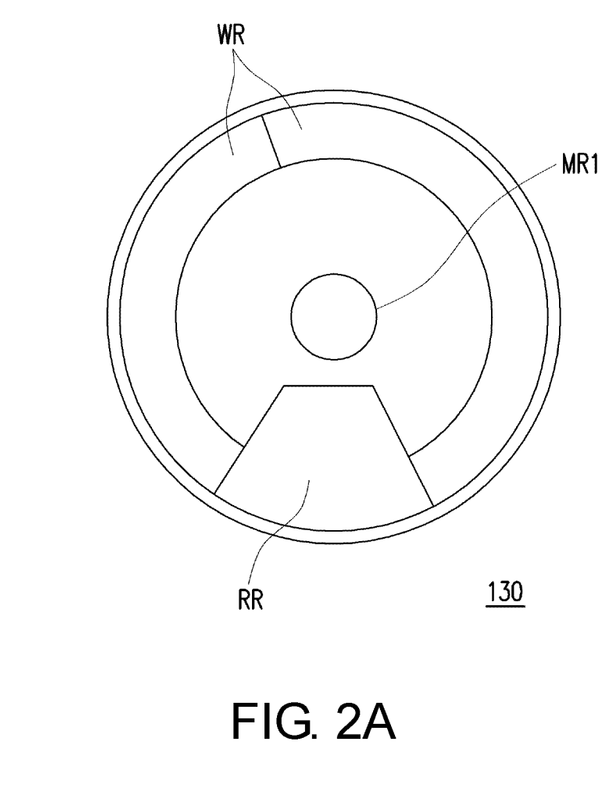
FIG. 2A is a front view of a wavelength conversion module of FIG. 1A.
Figure 2B:
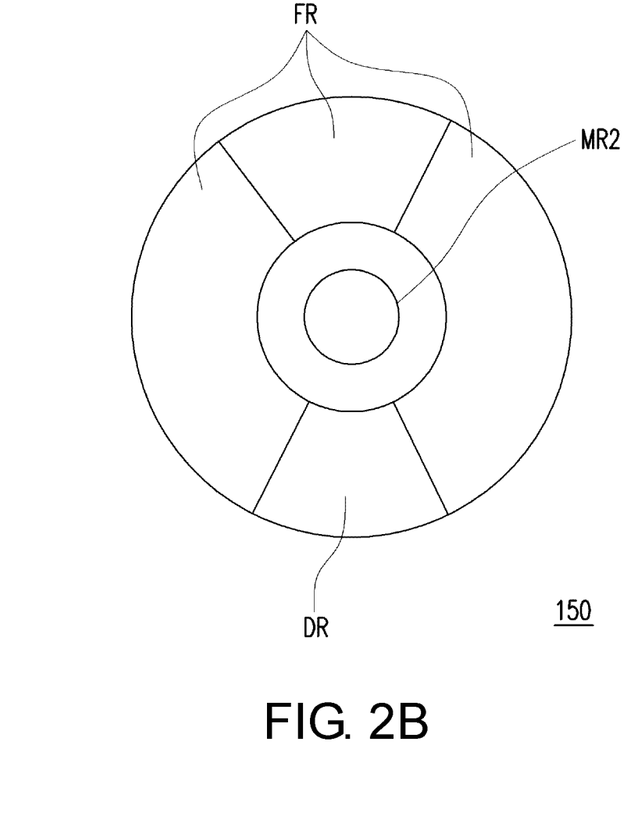
FIG. 2B is a front view of a filter module of FIG. 1A.
Figure 3A:
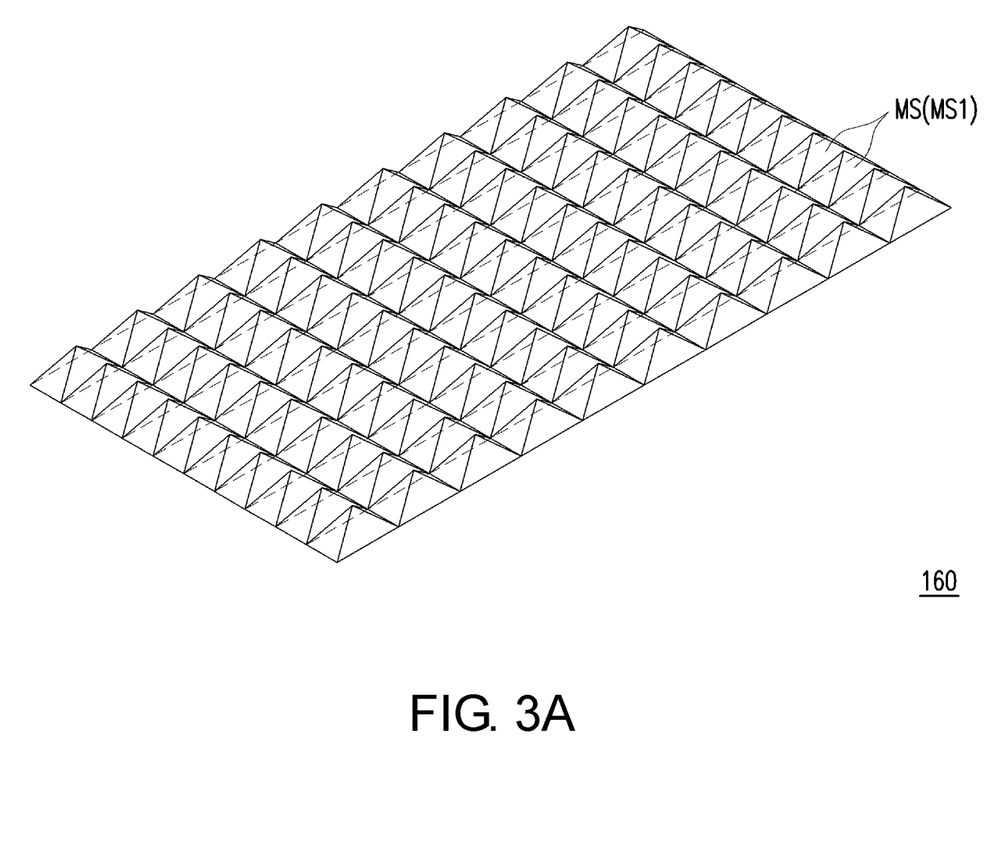
FIG. 3A and FIG. 3B are front views of different microstructures on a light combining prism of FIG. 1A.
Figure 3B:
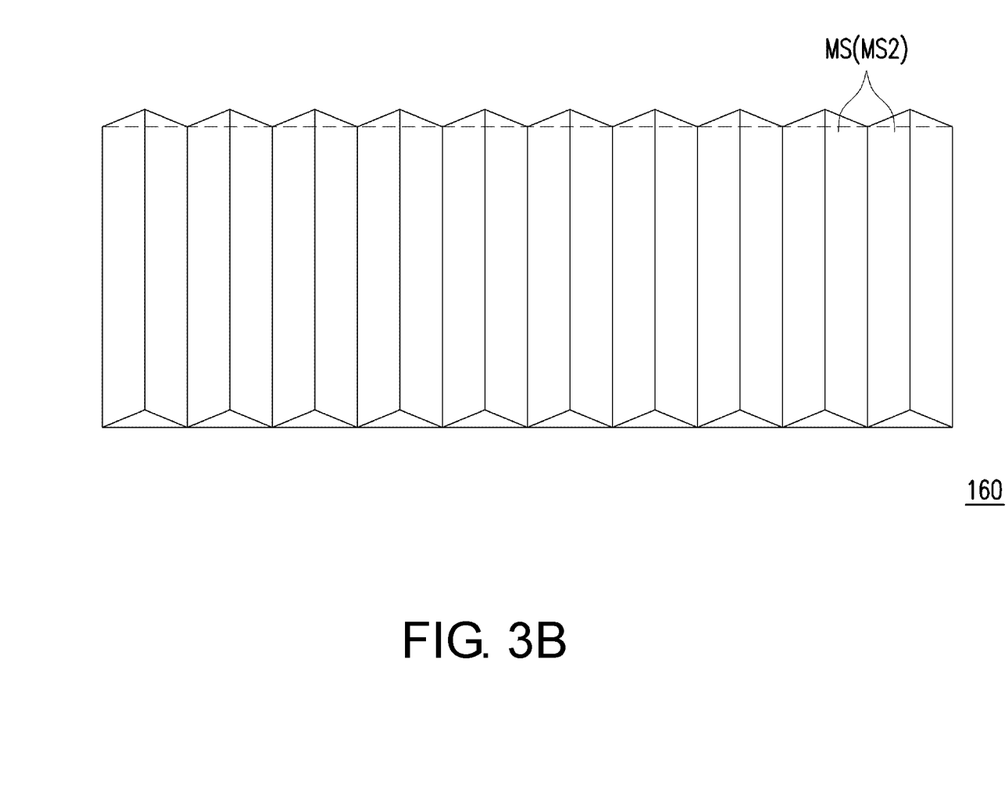

FIG. 1A is a structural schematic diagram of a projection device according to an embodiment of the invention. FIG. 2A is a front view of a wavelength conversion module of FIG. 1A. FIG. 2B is a front view of a filter module of FIG. 1A. FIG. 3A and FIG. 3B are front views of different microstructures on a light combining prism of FIG. 1A. Referring to FIG. 1A, in the embodiment, the projection device 200 includes an illumination system 100, a light valve 210 and a projection lens 220. In the embodiment, the light valve 210 is, for example, a Digital Micro-mirror Device (DMD) or a Liquid-Crystal-On-Silicon (LCOS) panel. However, in other embodiments, the light valve 210 may also be a tansmissive liquid crystal panel or other light beam modulator.

To be specific, as shown in FIG. 1A, the illumination system 100 is configured to provide an illumination light beam 70. The illumination system 100 includes an excitation light source 110, a light combining prism 120, a wavelength conversion module 130 and a light homogenizing element 140. The excitation light source 110 is configured to emit an exciting light beam 50. For example, in the embodiment, the excitation light source 110 is a blue light laser light source, and the exciting light beam 50 is a blue light. The excitation light source 110, for example, includes a plurality of blue laser diodes arranged in an array (not shown), though the invention is not limited thereto.

Further, in FIG. 1A, in the embodiment, the light combining prism 120 is located on a transmission path of the exciting light beam 50, and located between the excitation light source 110 and the wavelength conversion module 130. To be specific, as shown in FIG. 1A, in the embodiment, the light combining prism 120 has a first surface S1, a second surface S2 and a third surface S3. In the embodiment, the first surface S1 is a curved surface, such that the first surface S1 may change a propagating path of the exciting light beam 50, and is configured to control an irradiation angle of the exciting light beam 50 transmitted to the second surface S2 after entering the light combining prism 120, though the invention is not limited thereto. In other embodiments, the first surface S1 may also be a plane.

For example, in the embodiment, the light combining prism 120 has an anti-reflecting film AR located on the first surface S1. The anti-reflecting film AR may be formed on the first surface S1 through a coating manner. The exciting light beam 50 may be transmitted into the light combining prism 120 through the anti-reflecting film AR, and the anti-reflecting film AR may reduce reflectivity of the incident exciting light beam 50, so that the exciting light beam 50 with different incident angles may effectively enter the light combining prism 120, so as to improve a usage rate of the exciting light beam 50.

In the embodiment, the light combining prism 120 has a dichroic mirror film DM, which is also located on the first surface S1. The dichroic mirror film DM is formed on the first surface S1 through a coating manner. The dichroic mirror film DM is pervious to the blue light, and reflects a yellow light and a green light. To be specific, in the embodiment, the anti-reflecting film AR is located between the excitation light source 110 and the dichroic mirror film DM. In other words, in the embodiment, the anti-reflecting film AR is closer to the excitation light source 110 compared to the dichroic mirror film DM, and the exciting light beam 50 first passes through the anti-reflecting film AR, and then passes through the dichroic mirror film DM to enter the light combining prism 120. As shown in FIG. 1A, in the embodiment, since the exciting light beam 50 is the blue light, the exciting light beam 50 enters the light combining prism 120 through the first surface S1.

Moreover, as shown in FIG. 1A, in the embodiment, the illumination system 100 further includes an optical structure film 160. The optical structure film 160 is located on the second surface S2 of the light combining prism 120. For example, in the embodiment, materials of the optical structure film 160 and the light combining prism 120 may be different or the same (for example, glass), though reflectivity of the optical structure film 160 and reflectivity of the light combining prism 120 are difference, and a refractive index of the light combining prism 120 is greater than a refractive index of the optical structure film 160, so that an interface (i.e. the second surface S2) of the light combining prism 120 and the optical structure film 160 has a critical angle that may produce a total internal reflection. Moreover, in the embodiment, the first surface S1 and the second surface S2 have an included angle θ there between, and an angle range of the included angle θ is between 80 degrees and 100 degrees. Therefore, as shown in FIG. 1A, in the embodiment, after the exciting light beam 50 enters the light combining prism 120, an angle of the exciting light beam 50 incident to the second surface S2 is larger than the critical angle of the total internal reflection, and the exciting light beam 50 is totally reflected by the second surface S2. Thereafter, the exciting light beam 50 leaves the light combining prism 120 through the third surface S3 and is transmitted to the wavelength conversion module 130.

Then, as shown in FIG. 1A and FIG. 2A, in the embodiment, the wavelength conversion module 130 is located on the transmission path of the exciting light beam 50. The wavelength conversion module 130 has a substrate 131. The substrate 131 has at least one wavelength conversion region WR and a reflecting region RR. The substrate 131 is, for example, a disk device having a reflection function. The substrate 131 may be made of a metal material or a ceramic material. For example, as shown in FIG. 1A and FIG. 2A, the wavelength conversion region WR includes a wavelength conversion layer 132 used for converting the exciting light beam 50 into at least one wavelength converted light beam 60. On the other hand, the reflecting region RR may include a high reflective layer disposed on the substrate 131, which is used for reflecting the exciting light beam 50. In other embodiments, the reflecting region RR may be an optical element with a reflective coating. As shown in FIG. 1A and FIG. 2A, in the embodiment, the wavelength conversion module 130 further includes a first actuator MR1, which is used for driving the reflecting region RR and the at least one wavelength conversion region WR of the wavelength conversion module 130 to enter an irradiation range of the exciting light beam 50 at different timings.

For example, as shown in FIG. 1A and FIG. 2A, in the embodiment, the wavelength conversion module 130 is, for example, a phosphor wheel. When the at least one wavelength conversion region WR of the wavelength conversion module 130 enters the irradiation range of the exciting light beam 50, the at least one wavelength conversion region WR of the wavelength conversion module 130 converts the exciting light beam 50 into at least one wavelength converted light beam 60, and the at least one wavelength converted light beam 60 is transmitted (reflected) to the light combining prism 120. For example, in the embodiment, the wavelength conversion region WR respectively have a yellow phosphor powder and a green phosphor powder, so that the wavelength converted light beam 60 may be a yellow color light and a green color light. The yellow phosphor powder is defined as a phosphor powder for converting the exciting light beam 50 into the yellow color light, and the green phosphor powder is defined as a phosphor powder for converting the exciting light beam 50 into the green color light. On the other hand, the reflecting region RR of the wavelength conversion module 130 is used for reflecting the exciting light beam 50 to transmit the exciting light beam 50 to the light combining prism 120.

Then, as shown in FIG. 1A, in the embodiment, the at least one wavelength converted light beam 60 coming from the wavelength conversion module 130 or the exciting light beam 50 again sequentially passes through the third surface S3 and the second surface S2 of the light combining prism 120 to leave the light combining prism 120. Moreover, in the embodiment, since the dichroic mirror film DM on the first surface S1 may provide a reflection function to the yellow light and the green light, when the wavelength converted light beams 60 leave the wavelength conversion module 130 in a large angle, the wavelength converted light beams 60 are also transmitted back to the first surface S1 of the light combining prism 120 in the large angle based on the total internal reflection of the second surface S2, and are then again reflected to the second surface S2 by the first surface S1 of the light combining prism 120 to leave the light combining prism 120, so as to improve the light usage rate.

Moreover, as shown in FIG. 1A, in the embodiment, the optical structure film 160 is located on the transmission path of the exciting light beam 50 and the at least one wavelength converted light beam 60, and has a plurality of microstructures MS. Therefore, when the at least one wavelength converted light beam 60 coming from the wavelength conversion module 130 or the exciting light beam 50 penetrates through the second surface S2 of the light combining prism 120, the at least one wavelength converted light beam 60 or the exciting light beam 50 further passes through the micro structures MS of the optical structure film 160. For example, profiles of the micro structures MS may be a plurality of tapered microstructures MS1 arranged in an array as shown in FIG. 3A or strip microstructures MS2 as shown in FIG. 3B. When the optical structure film 160 has the strip microstructures MS2 as shown in FIG. 3B, the optical structure film 160 is, for example, a Brightness Enhancement Film (BEF) adhered on the light combining prism 120, though the invention is not limited thereto.

To be specific, as shown in FIG. 1A, in the embodiment, the microstructures MS face to the light homogenizing element 140, so that the at least one wavelength converted light beam 60 or the exciting light beam 50 penetrating through the second surface S2 of the light combining prism 120 may achieve a collimation effect through the microstructures MS on the optical structure film 160. In this way, the at least one wavelength converted light beam 60 with the large angle or the exciting light beam 50 with the large angle are also collimated and converged and further transmitted to the light homogenizing element 140.

In this way, since the light path design that the exciting light beam 50 and the at least one wavelength converted light beam 60 converted from the exciting light beam 50 are transmitted to the subsequent optical elements is based on configuration of the light combining prism 120, and propagating paths of the exciting light beam 50 and the at least one wavelength converted light beam 60 in the light combining prism 120 are dispersed due to a light dispersion principle, energy density in the light combining prism 120 is prevented from being excessively concentrated, so that a tolerance of the optical elements to the exciting light beam 50 is improved, thereby increasing reliability of the illumination system 100 and the projection device 200.

Then, as shown in FIG. 1A, in the embodiment, the light homogenizing element 140 is located on the transmission path of the exciting light beam 50 and the at least one wavelength converted light beam 60. In the embodiment, the light homogenizing element 140 includes an integrating rod, though the invention is not limited thereto. To be more specific, as shown in FIG. 1A, the at least one wavelength converted light beam 60 or the exciting light beam 50 is transmitted to the light homogenizing element 140 after passing through the optical structure film 160. Moreover, as shown in FIG. 1A, when the exciting light beam 50 and the at least one wavelength converted light beam 60 are transmitted to the light homogenizing element 140, the light homogenizing element 140 may homogenize the exciting light beam 50 and the at least one wavelength converted light beam 60, and transmit the same to the light valve 210.

In this way, since the exciting light beam 50 and the at least one wavelength converted light beam 60 may be incident to the light homogenizing element 140 along a similar light path and incident angle, the angle at which the exciting light beam 50 is incident to the light homogenizing element 140 may be the same as the angle at which the at least one wavelength converted light beam 60 is incident to the light homogenizing element 140, which avails adjusting uniformity of the illumination light beam 70 formed by the exciting light beam 50 and the at least one wavelength converted light beam 60.

On the other hand, as shown in FIG. 1A and FIG. 2B, in the embodiment, the illumination system 100 further includes a filter module 150, and the filter module 150 is also located on the transmission path of the exciting light beam 50 and the at least one wavelength converted light beam 60, where the filter module 150 has at least one filter region FR and a diffuser region DR. As show in FIG. 1A and FIG. 2B, in the embodiment, the filter module 150 further includes a second actuator MR2, which is used for driving the at least one filter region FR to enter an irradiation range of the at least one wavelength converted light beam 60 at different timings to convert the at least one wavelength converted light beam 60 into a first color light 70A, and driving the diffuser region DR to enter an irradiation range of the exciting light beam 50 at different timings to convert the exciting light beam 50 into a second color light 70B. For example, in the embodiment, the filter region FR is respectively configured with a red filter, a green filter or a yellow filter, so that the first color light 70A is, for example, a red color light, a green color light or a yellow color light. The diffuser region DR has a diffuser used for spoiling coherence of the exciting light beam 50. The second color light 70B may be a blue color light. Therefore, the exciting light beam 50 and the at least one wavelength converted light beam 60 may be converted into the illumination light beam 70 including the first color light 70A and the second color light 70B in timing, and converted into a plurality of different colors in timing.

It should be noted that as shown in FIG. 1A, in the embodiment, the light homogenizing element 140 is located between the light combining prism 120 and the filter module 150, so that the exciting light beam 50 and the at least one wavelength converted light beam 60 are first homogenized by the light homogenizing element 140, and then pass through the filter module 150 to form the illumination light beam 70, and the illumination light beam is then transmitted to the light valve 210.

Then, as shown in FIG. 1A, the light valve 210 is located on a transmission path of the illumination light beam 70, and is configured to convert the illumination light beam 70 into an image light beam 80. The projection lens 220 is located on a transmission path of the image light beam 80, and is configured to convert the image light beam 80 into a projection light beam 90 to project the projection light beam 90 onto a screen (not shown), so as to form an image. Since after the illumination light beam 70 is converged to the light valve 210, the light valve 210 sequentially converts the illumination light beam 70 into the image light beam 80 of different colors for transmitting to the projection lens 220, the image formed from the image light beam 80 converted by the light valve 210 may be a color image.

In this way, the projection device 200 and the illumination system 100 adopt the configuration of the light combining prism 120, so that the exciting light beam 50 and the at least one wavelength converted light beam 60 may be incident to the light homogenizing element 140 along a similar light path and incident angle, which avails adjusting uniformity of the illumination light beam 70 formed by the exciting light beam 50 and the at least one wavelength converted light beam 60, so as to achieve good image quality of the projected image. Moreover, by configuring the light combining prism 120, the projection device 200 and the illumination system 100 are unnecessary to configure an additional light path loop for the blue light, so as to achieve a system framework of a small volume.

Figure 1B:
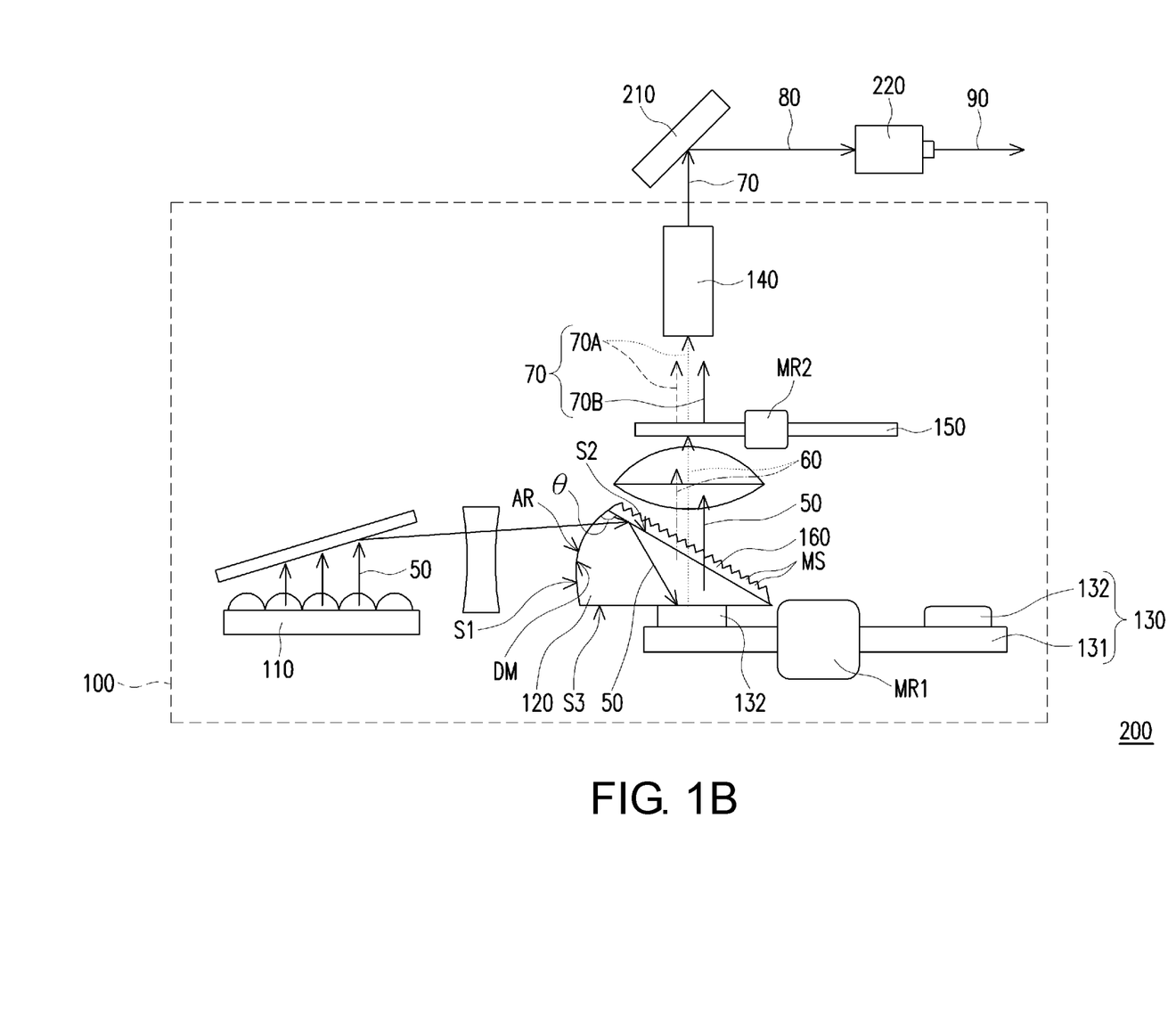
FIG. 1B is a structural schematic diagram of a projection device according to another embodiment of the invention.

FIG. 1B is a structural schematic diagram of a projection device according to another embodiment of the invention. The illumination system and the projection device of the embodiment of FIG. 1B are similar to the illumination system and the projection device of the embodiment of FIG. 1A, and a difference there between is that the filter module 150 is, for example, located between the light combining prism 120 and the light homogenizing element 140.

As shown in FIG. 1B, in the embodiment, the optical structure film 160 is located on the transmission path of the exciting light beam 50 and the at least one wavelength converted light beam 60. Therefore, after the at least one wavelength converted light beam 60 coming from the wavelength conversion module 130 or the exciting light beam 50 penetrates through the second surface S2 of the light combining prism 120, the at least one wavelength converted light beam 60 or the exciting light beam 50 passes through the microstructures MS of the optical structure film 160. To be specific, the microstructures MS face to the filter module 150, so that the at least one wavelength converted light beam 60 or the exciting light beam 50 penetrating through the second surface S2 of the light combining prism 120 may achieve a collimation effect through the microstructures MS on the optical structure film 160. In this way, the at least one wavelength converted light beam 60 with the large angle or the exciting light beam 50 with the large angle are also collimated and converged and further transmitted to the filter module 150. Therefore, since the light path design that the exciting light beam 50 and the at least one wavelength converted light beam 60 converted from the exciting light beam 50 are transmitted to the subsequent optical elements is based on configuration of the light combining prism 120, and propagating paths of the exciting light beam 50 and the at least one wavelength converted light beam 60 in the light combining prism 120 are dispersed due to a light dispersion principle, energy density in the light combining prism 120 is prevented from being excessively concentrated, so that a tolerance of the optical elements to the exciting light beam 50 is improved, thereby increasing reliability of the illumination system 100 and the projection device 200.

Then, as shown in FIG. 1B, in the embodiment, the filter module 150 is located on the transmission path of the exciting light beam 50 and the at least one wavelength converted light beam 60. To be specific, the at least one wavelength converted light beam 60 or the exciting light beam 50 is transmitted to the filter module 150 after passing through the optical structure film 160. The at least one filter region FR enters the irradiation range of the at least one wavelength converted light beam 60 in timing to convert the at least one wavelength converted light beam 60 into the first color light 70A, and the diffuser region DR enters the irradiation range of the exciting light beam 50 in timing to convert the exciting light beam 50 into the second color light 70B. When the first color light 70A and the second color light 70B are transmitted to the light homogenizing element 140, the light homogenizing element 140 may homogenize the first color light 70A and the second color light 70B, and transmit the same to the light valve 210.

In this way, since the first color light 70A and the second color light 70B may be incident to the light homogenizing element 140 in an incident angle similar with that of the exciting light beam 50 and the at least one wavelength converted light beam 60, the angle at which the second color light 70B is incident to the light homogenizing element 140 may be the same as the angle at which the first color light 70A is incident to the light homogenizing element 140, which avails adjusting uniformity of the illumination light beam 70 formed by the first color light 70A and the second color light 70B. Then, the illumination light beam 70 formed by the first color light 70A and the second color light 70B is transmitted to the light valve 210, the light valve 210 is located on the transmission path of the illumination light beam 70, and is configured to convert the illumination light beam 70 into the image light beam 80. The projection lens 220 is located on the transmission path of the image light beam 80, and is configured to convert the image light beam 80 into the projection light beam 90 to project the projection light beam 90 onto a screen (not shown), so as to form an image. Since after the illumination light beam 70 is converged to the light valve 210, the light valve 210 sequentially converts the illumination light beam 70 into the image light beam 80 of different colors for transmitting to the projection lens 220, the image formed from the image light beam 80 converted by the light valve 210 may be a color image.

Figure 4:
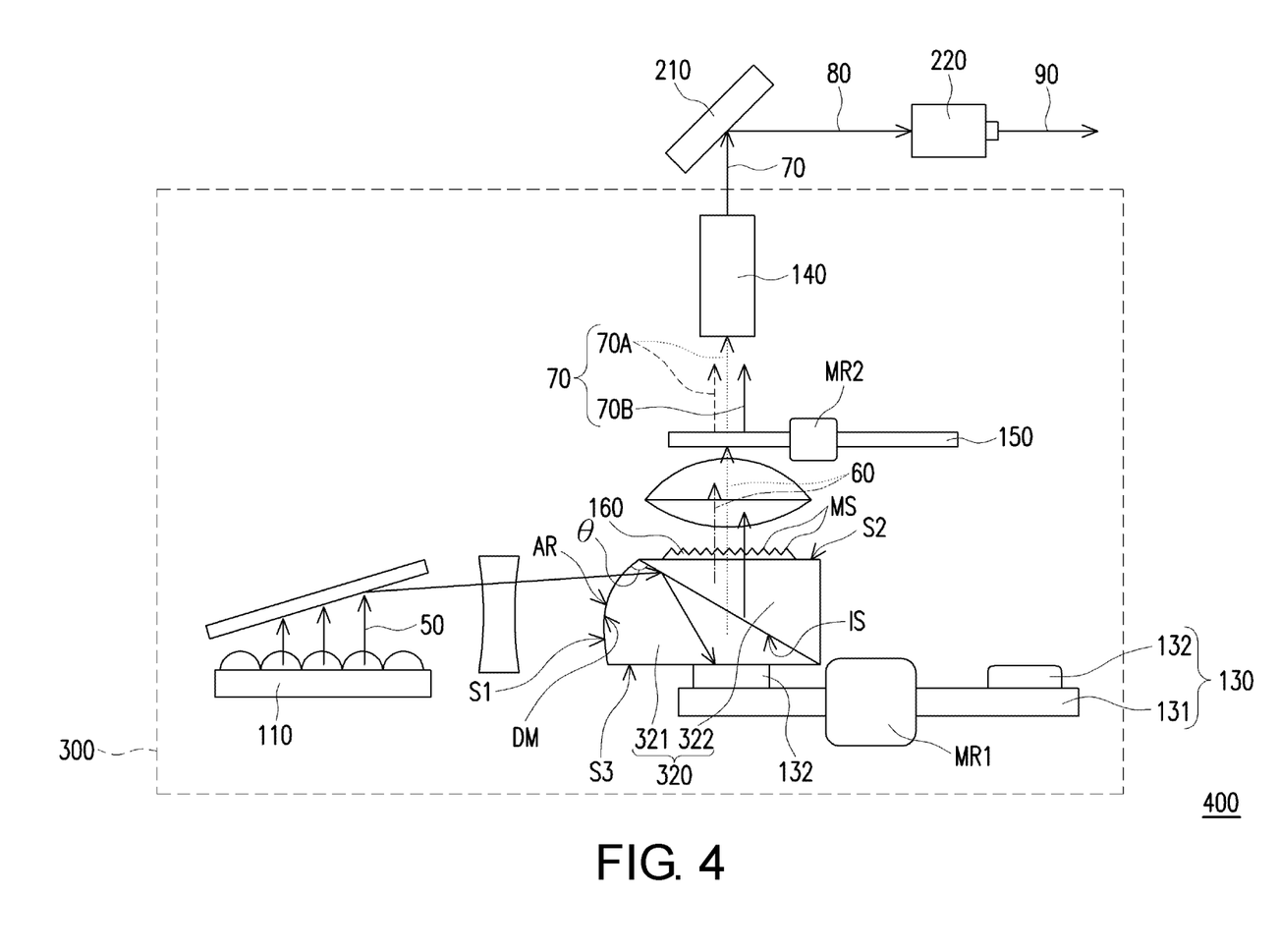
FIG. 4 is a structural schematic diagram of a projection device according to another embodiment of the invention.

FIG. 4 is a structural schematic diagram of a projection device according to another embodiment of the invention. Referring to FIG. 4, the illumination system 300 and the projection device 400 of the embodiment are similar to the illumination system 100 and the projection device 200 of FIG. 1B, and differences there between are as follows. In the embodiment, the light combining prism 320 of the illumination system 300 is, for example, composed of two wedge prisms 321 and 322. As shown in FIG. 4, in the embodiment, the first surface S1 of the light combining prism 320 is a surface of the wedge prism 321 facing to the excitation light source 110, the second surface S2 of the light combining prism 320 is a surface of the wedge prism 322 facing to the light homogenizing element 140, and a third surface S3 of the light combining prism 320 is a surface of the wedge prism 321 facing to the wavelength conversion module 130.

Moreover, in the embodiment, the wedge prism 322 and the wedge prism 321 have a gap there between, so that an interface IS between the wedge prism 322 and the wedge prism 321 may have a critical angle that may produce the total internal reflection. In another embodiment, a refractive index of the wedge prism 322 is greater than a refractive index of the wedge prism 321, so that interface IS between the wedge prism 322 and the wedge prism 321 may have a critical angle that may produce the total internal reflection. Moreover, in the embodiment, since the first surface S1 and the interface IS have an included angle θ there between, and an angle range of the included angle θ is between 80 degrees and 100 degrees, as shown in FIG. 4, in the embodiment, after the exciting light beam 50 enters the light combining prism 320, an angle of the exciting light beam 50 incident to the interface IS between the wedge prism 322 and the wedge prism 321 is greater than the critical angle of the total internal reflection, and the exciting light beam 50 is totally reflected by the interface IS. Thereafter, the exciting light beam 50 leaves the light combining prism 320 through the third surface S3 and is transmitted to the wavelength conversion module 130.

In this way, in the embodiment, since the light path design that the exciting light beam 50 and the at least one wavelength converted light beam 60 converted from the exciting light beam 50 are transmitted to the subsequent optical elements is based on configuration of the light combining prism 320, and propagating paths of the exciting light beam 50 and the at least one wavelength converted light beam 60 in the light combining prism 320 are dispersed due to a light dispersion principle, energy density in the light combining prism 320 is prevented from being excessively concentrated, so that a tolerance of the optical elements to the exciting light beam 50 is improved, thereby increasing reliability of the illumination system 300 and the projection device 400.

Moreover, since the illumination system 300 and the projection device 400 adopt the configuration of the light combining prism 320, the exciting light beam 50 and the at least one wavelength converted light beam 60 may be incident to the light homogenizing element 140 along a similar light path and incident angle, which avails adjusting uniformity of the illumination light beam 70 formed by the exciting light beam 50 and the at least one wavelength converted light beam 60, so as to achieve good image quality of the projected image. Moreover, by configuring the light combining prism 320, the illumination system 300 and the projection device 400 are unnecessary to configure an additional light path loop for the blue light, so as to achieve a system framework of a small volume. Therefore, the illumination system 300 and the projection device 400 may also have the advantages mentioned in introduction of the aforementioned illumination system 100 and the projection device 200, and detail thereof is not repeated.

Figure 5:
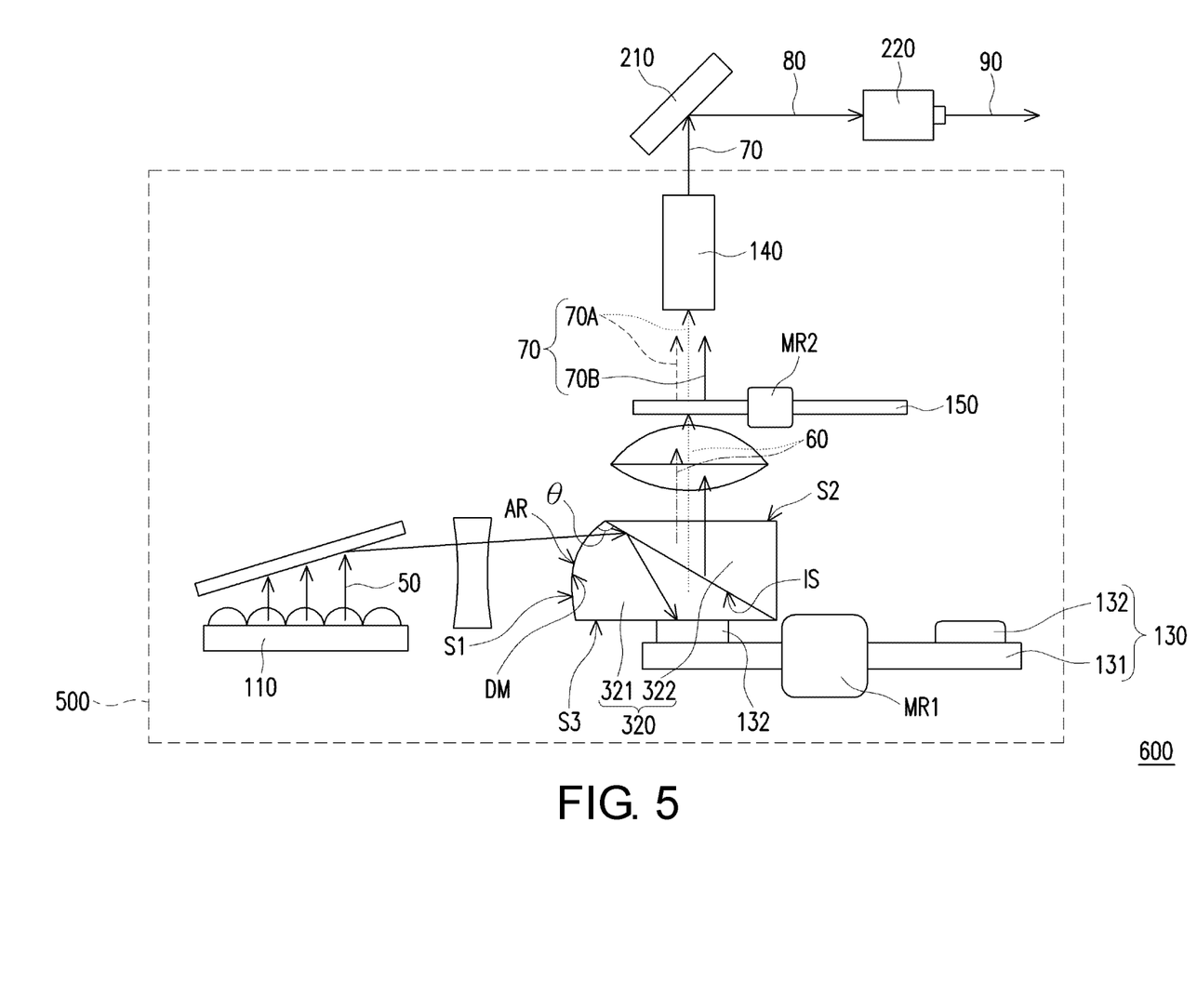
FIG. 5 is a structural schematic diagram of a projection device according to another embodiment of the invention.

FIG. 5 is a structural schematic diagram of a projection device according to another embodiment of the invention. Referring to FIG. 5, the illumination system 500 and the projection device 600 of the embodiment are similar to the illumination system 300 and the projection device 400 of FIG. 4, and differences there between are as follows. In the embodiment, the illumination system 500 does not have the optical structure film 160, i.e. the at least one wavelength converted light beam 60 or the exciting light beam 50 penetrating through the second surface S2 of the light combining prism 320 may be directly transmitted to the subsequent optical elements, and the collimation process via the microstructures MS on the optical structure film 160 is omitted.

However, in the embodiment, since the light path design that the exciting light beam 50 and the at least one wavelength converted light beam 60 converted from the exciting light beam 50 are transmitted to the subsequent optical elements is based on configuration of the light combining prism 320, and propagating paths of the exciting light beam 50 and the at least one wavelength converted light beam 60 in the light combining prism 320 are dispersed due to a light dispersion principle, energy density in the light combining prism 320 is prevented from being excessively concentrated, so that a tolerance of the optical elements to the exciting light beam 50 is improved, thereby increasing reliability of the illumination system 300 and the projection device 400.

Moreover, since the illumination system 500 and the projection device 600 adopt the configuration of the light combining prism 320, the exciting light beam 50 and the at least one wavelength converted light beam 60 may be incident to the light homogenizing element 140 along a similar light path and incident angle, which avails adjusting uniformity of the illumination light beam 70 formed by the exciting light beam 50 and the at least one wavelength converted light beam 60, so as to achieve good image quality of the projected image. Moreover, by configuring the light combining prism 320, the illumination system 500 and the projection device 600 are unnecessary to configure an additional light path loop for the blue light, so as to achieve a system framework of a small volume. Therefore, the illumination system 500 and the projection device 600 may also have the advantages mentioned in introduction of the aforementioned illumination system 300 and the projection device 400, and detail thereof is not repeated.

In summary, the embodiments of the invention have at least one of following advantages or effects. In the embodiments of the invention, in the projection device and the illumination system, by configuring the light combining prism, the exciting light beam and the at least one wavelength converted light beam may be incident to the light homogenizing element in the similar light path and incident angle, which avails adjusting uniformity of the illumination light beam formed by the exciting light beam and the at least one wavelength converted light beam, so as to achieve good image quality of the projected image. Moreover, in the projection device and the illumination system, by configuring the light combining prism, it is unnecessary to configure an additional light path loop framework for the blue light, so as to achieve a system framework with a small volume. Moreover, since the exciting light beam and the at least one wavelength converted light beam converted from the exciting light beam are transmitted to the subsequent optical elements through the light combining prism, and propagating paths of the above light beams in the light combining prism are dispersed due to a light dispersion principle, energy density in the light combining prism is prevented from being excessively concentrated, so that a tolerance of the optical elements to the exciting light beam is improved, thereby increasing reliability of the illumination system and the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, and the illumination system comprising:
   an excitation light source, configured to emit an exciting light beam;
   a wavelength conversion module, located on a transmission path of the exciting light beam, and having at least one wavelength conversion region and a reflecting region;
   a light combining prism, located on the transmission path of the exciting light beam, and having a first surface, a second surface and a third surface, wherein the exciting light beam enters the light combining prism through the first surface, and the exciting light beam is totally reflected by the second surface to leave the light combining prism through the third surface and is transmitted to the wavelength conversion module, the exciting light beam is converted into at least one wavelength converted light beam by the at least one wavelength conversion region of the wavelength conversion module or reflected by the reflecting region of the wavelength conversion module at different timings, and the at least one wavelength converted light beam coming from the wavelength conversion module or the exciting light beam sequentially penetrates through the third surface and the second surface of the light combining prism to leave the light combining prism; and
   a filter module, located on the transmission path of the exciting light beam and the at least one wavelength converted light beam, wherein the filter module has at least one filter region and a diffuser region, the at least one filter region enters an irradiation range of the at least one wavelength converted light beam at different timings to convert the at least one wavelength converted light beam into a first color light, and the diffuser region enters an irradiation range of the exciting light beam at different timings to convert the exciting light beam into a second color light, and the illumination beam comprises the first color light and the second color light.

2. The illumination system as claimed in claim 1, further comprising:

an optical structure film, located on a transmission path of the exciting light beam and the at least one wavelength converted light beam, and located on the second surface of the light combining prism, wherein the optical structure film has a plurality of microstructures, and the at least one wavelength converted light beam coming from the wavelength conversion module passes through the plurality of microstructures of the optical structure film or the excitation beam passes through the plurality of microstructures of the optical structure film after penetrating through the second surface.

3. The illumination system as claimed in claim 2, wherein a refractive index of the optical structure film is different to a refractive index of the light combining prism.

4. The illumination system as claimed in claim 2, further comprising:
a light homogenizing element, located on the transmission path of the exciting light beam and the at least one wavelength converted light beam, and configured to homogenize the exciting light beam and the at least one wavelength converted light beam, and the at least one wavelength converted light beam or the exciting light beam is transmitted to the light homogenizing element after passing through the optical structure film.

5. The illumination system as claimed in claim 1, wherein the light combining prism has a dichroic mirror film located on the first surface, and the dichroic mirror film is pervious to a blue light, and reflects a yellow light and a green light.

6. The illumination system as claimed in claim 5, wherein the light combining prism has an anti-reflecting film located on the first surface, and the anti-reflecting film is located between the dichroic mirror film and the excitation light source.

7. The illumination system as claimed in claim 1, wherein the first surface and the second surface have an included angle there between, and an angle range of the included angle is between 80 degrees and 100 degrees.

8. A projection device, comprising:
an illumination system, configured to provide an illumination beam, and comprising:
an excitation light source, configured to emit an exciting light beam;
a wavelength conversion module, located on a transmission path of the exciting light beam, and having at least one wavelength conversion region and a reflecting region;
a light combining prism, located on the transmission path of the exciting light beam, and having a first surface, a second surface and a third surface, wherein the exciting light beam enters the light combining prism through the first surface, and the exciting light beam is totally reflected by the second surface to leave the light combining prism through the third surface and is transmitted to the wavelength conversion module, the exciting light beam is converted into at least one wavelength converted light beam by the at least one wavelength conversion region of the wavelength conversion module or reflected by the reflecting region of the wavelength conversion module at different timings, and the at least one wavelength converted light beam coming from the wavelength conversion module or the exciting light beam sequentially penetrates through the third surface and the second surface of the light combining prism to leave the light combining prism; and
a filter module, located on the transmission path of the exciting light beam and the at least one wavelength converted light beam, wherein the filter module has at least one filter region and a diffuser region, the at least one filter region enters an irradiation range of the at least one wavelength converted light beam at different timings to convert the at least one wavelength converted light beam into a first color light, and the diffuser region enters an irradiation range of the exciting light beam at different timings to convert the exciting light beam into a second color light, and the illumination beam comprises the first color light and the second color light;
a light valve, located on the transmission path of the illumination light beam, and configured to convert the illumination light beam into an image light beam; and
a projection lens, located on a transmission path of the image light beam, and configured to convert the image light beam into a projection light beam.

9. The projection device as claimed in claim 8, further comprising:
an optical structure film, located on a transmission path of the exciting light beam and the at least one wavelength converted light beam, and located on the second surface of the light combining prism, wherein the optical structure film has a plurality of microstructures, and the at least one wavelength converted light beam coming from the wavelength conversion module passes through the plurality of microstructures of the optical structure film or the excitation beam passes through the plurality of microstructures of the optical structure film after penetrating through the second surface.

10. The projection device as claimed in claim 9, wherein a refractive index of the optical structure film is different to a refractive index of the light combining prism.

11. The projection device as claimed in claim 9, further comprising:
a light homogenizing element, located on the transmission path of the exciting light beam and the at least one wavelength converted light beam, and configured to homogenize the exciting light beam and the at least one wavelength converted light beam, and the at least one wavelength converted light beam or the exciting light beam is transmitted to the light homogenizing element after passing through the optical structure film.

12. The projection device as claimed in claim 8, wherein the light combining prism has a dichroic mirror film located on the first surface, and the dichroic mirror film is pervious to a blue light, and reflects a yellow light and a green light.

13. The projection device as claimed in claim 12, wherein the light combining prism has an anti-reflecting film located on the first surface, and the anti-reflecting film is located between the dichroic mirror film and the excitation light source.

14. The projection device as claimed in claim 8, wherein the first surface and the second surface have an included angle there between, and an angle range of the included angle is between 80 degrees and 100 degrees.

* * * * *